US00RE49252E

(19) United States
(12) Reissued Patent
Hollinger

(10) Patent Number: US RE49,252 E
(45) Date of Reissued Patent: *Oct. 18, 2022

(54) SOLAR DISK LIGHT WITH SWIVEL MOUNT

(71) Applicant: E. MISHAN & SONS, INC., New York, NY (US)

(72) Inventor: Fred Hollinger, Monroe Township, NJ (US)

(73) Assignee: E. MISHAN & SONS, INC., New York, NY (US)

( * ) Notice: This patent is subject to a terminal disclaimer.

(21) Appl. No.: 16/900,317

(22) Filed: Jun. 12, 2020

Related U.S. Patent Documents

Reissue of:
(64) Patent No.: 10,309,590
Issued: Jun. 4, 2019
Appl. No.: 16/231,813
Filed: Dec. 24, 2018

U.S. Applications:
(63) Continuation-in-part of application No. 29/662,559, filed on Sep. 6, 2018, now Pat. No. Des. 841,873.

(51) Int. Cl.
*F21L 4/04* (2006.01)
*F21V 33/00* (2006.01)
(Continued)

(52) U.S. Cl.
CPC ..... *F21L 4/04* (2013.01); *F21L 4/08* (2013.01); *F21V 21/30* (2013.01); *F21V 33/006* (2013.01)

(58) Field of Classification Search
None
See application file for complete search history.

(56) References Cited

U.S. PATENT DOCUMENTS 4,835,664 A 5/1989 Wen
5,055,984 A 10/1991 Hung et al.
(Continued)

FOREIGN PATENT DOCUMENTS

CN 200830247356.0 11/2009
CN 201530557956.7 6/2016
(Continued)

OTHER PUBLICATIONS https://www.amazon.com/ONEVER-Lighting-Waterproof-Driveway-Pathway/dp/B078LW7ZLT/, "8-LEDs Solar Power Ground Light, ONEVER Spike Lighting Built-in Light Sensor IPX4 Waterproof for Path Floor Yard Driveway Lawn Pathway (Pack of 4X)", Dec. 24, 2017.
(Continued)

*Primary Examiner* — Glenn K Dawson
(74) *Attorney, Agent, or Firm* — Notaro, Michalos & Zaccaria P.C.

(57) ABSTRACT

A tiltable solar disk light has a solar light disk body comprising a disk-shaped housing which houses solar cells, LEDs, a rechargeable battery, a pushbutton switch, and driver electronics configured to deliver power to the LEDs from the battery when the switch is in the ON position and the solar cells are not detecting ambient light and to cut off power to the LEDs when the switch is in the OFF position or the solar cells are detecting ambient light. The disk body is tiltably and rotatably supported in a frame, on a pair of pegs extending from the housing, with enough clearance space about the disk body to permit tilting and rotating within the frame. A landscape spike is optionally connected to the frame by curved arms configured to define a clearance gap between the spike and the frame to permit the disk body to tilt within the frame about the axis of rotation formed by the pegs.

20 Claims, 9 Drawing Sheets

(51) Int. Cl.

| | |
|---|---|
| ***F21V 21/30*** | (2006.01) |
| ***F21L 4/08*** | (2006.01) |
| ***F21S 8/08*** | (2006.01) |

(56) References Cited

U.S. PATENT DOCUMENTS

| | | | | |
|---|---|---|---|---|
| 6,013,985 | A | 1/2000 | Green et al. | |
| 6,131,321 | A | 10/2000 | Daigle, Jr. | |
| D438,322 | S | 2/2001 | Skradski et al. | |
| D445,523 | S | 7/2001 | Skradski et al. | |
| D450,150 | S | 11/2001 | Skradski et al. | |
| D451,618 | S | 12/2001 | Skradski et al. | |
| D451,619 | S | 12/2001 | Skradski et al. | |
| 6,339,188 | B1 | 1/2002 | Voelkner | |
| 6,406,163 | B1 | 6/2002 | Yang | |
| D483,903 | S | 12/2003 | Skradski et al. | |
| D483,904 | S | 12/2003 | Skradski et al. | |
| 6,729,742 | B2 | 5/2004 | Wismeth et al. | |
| D494,536 | S | 8/2004 | Pu | |
| D517,717 | S | 3/2006 | Sanoner | |
| D517,719 | S | 3/2006 | Sanoner | |
| 7,029,144 | B2 | 4/2006 | Fu | |
| 7,172,307 | B2 | 2/2007 | Izardel | |
| 7,196,477 | B2 | 3/2007 | Richmond | |
| D551,791 | S | 9/2007 | Sanoner | |
| D555,278 | S | 11/2007 | Sanoner | |
| D556,933 | S | 12/2007 | Sanoner | |
| D574,104 | S | 7/2008 | Sanoner | |
| 7,429,827 | B2 | 9/2008 | Richmond | |
| 7,503,669 | B2 | 3/2009 | Rizkin et al. | |
| 7,588,349 | B2 | 9/2009 | Yen | |
| D605,326 | S | 12/2009 | Sanoner | |
| D616,129 | S | 5/2010 | Sanoner | |
| 7,887,214 | B2 | 2/2011 | Chang et al. | |
| D642,722 | S | 8/2011 | Oberpriller | |
| 8,186,857 | B2 | 5/2012 | Porter | |
| 8,203,285 | B2 | 6/2012 | Chen | |
| 8,220,959 | B2 | 7/2012 | Rizkin et al. | |
| 8,222,823 | B2 | 7/2012 | Hsu | |
| 8,292,452 | B2 | 10/2012 | Ko | |
| 8,348,452 | B2 | 1/2013 | Zheng | |
| 8,362,700 | B2 | 1/2013 | Richmond | |
| 8,454,208 | B2 | 6/2013 | Porter | |
| 8,602,585 | B1 | 12/2013 | Lowe | |
| D698,061 | S | 1/2014 | Burke | |
| 8,632,234 | B1 | 1/2014 | Lowe | |
| 8,664,866 | B2 | 3/2014 | Kay | |
| 8,845,126 | B1 | 9/2014 | Martzall | |
| D743,079 | S | 11/2015 | Adair | |
| 9,175,821 | B2 | 11/2015 | Adair | |
| 9,222,634 | B2 | 12/2015 | Zhu | |
| 9,273,841 | B2 | 3/2016 | Philhower et al. | |
| 9,335,013 | B2 | 5/2016 | Martzall | |
| D770,076 | S | 10/2016 | Li et al. | |
| 9,572,304 | B2 | 2/2017 | Harari | |
| 9,657,909 | B2 | 5/2017 | Cohen | |
| D800,940 | S | 10/2017 | Guzzini | |
| 10,107,484 | B2 * | 10/2018 | Moyers | A01D 34/001 |
| 11,204,143 | B1 * | 12/2021 | Hollinger | F21V 3/02 |
| 11,353,181 | B1 * | 6/2022 | Mishan | F21V 9/45 |
| 11,353,182 | B1 * | 6/2022 | Mishan | F21V 23/0435 |
| 2003/0137831 | A1 | 7/2003 | Lin | |
| 2006/0012996 | A1 | 1/2006 | Tseng | |
| 2006/0187656 | A1 | 8/2006 | Kuelbs et al. | |
| 2007/0002561 | A1 | 1/2007 | Tesmer et al. | |
| 2007/0121317 | A1 | 5/2007 | Huang et al. | |
| 2007/0263381 | A1 | 11/2007 | Goldman et al. | |
| 2009/0027900 | A1 | 1/2009 | Janos et al. | |
| 2009/0059572 | A1 | 3/2009 | Wang | |
| 2009/0129067 | A1 * | 5/2009 | Fan | B63B 51/02 362/183 |
| 2009/0196041 | A1 | 8/2009 | Joseph | |
| 2011/0013384 | A1 | 1/2011 | Lu | |
| 2011/0292643 | A1 | 12/2011 | Chen | |
| 2011/0310597 | A1 | 12/2011 | Lu | |
| 2012/0243214 | A1 * | 9/2012 | Richmond | F21S 9/035 362/183 |
| 2013/0250559 | A1 * | 9/2013 | Hawkins | G09F 13/04 362/183 |
| 2016/0230972 | A1 | 8/2016 | Choi et al. | |
| 2016/0334068 | A1 | 11/2016 | Katsaros | |
| 2017/0040932 | A1 * | 2/2017 | Lillywhite | H02S 20/30 |
| 2017/0135226 | A1 | 5/2017 | Chen | |
| 2017/0184260 | A1 | 6/2017 | Munoz Abogabir | |
| 2019/0036359 | A1 * | 1/2019 | Smith | H02J 7/0027 |

FOREIGN PATENT DOCUMENTS

| | | |
|---|---|---|
| CN | 106764844 | 5/2017 |
| EM | 000380670-001 | 11/2005 |
| EM | 002733949-0041 | 8/2015 |
| EM | 004362432 | 9/2017 |
| EM | 004426237 | 11/2017 |
| EM | 004129617-0001 | 8/2018 |
| EP | 000380670-001 | 11/2005 |
| EP | 002733949-0041 | 8/2015 |
| EP | 004362432 | 9/2017 |
| EP | 004426237 | 11/2017 |
| EP | 004129617-0001 | 8/2018 |

OTHER PUBLICATIONS

European Extended Search Report in Application EP 19 17 2898 dated Aug. 13, 2019.

https://www.amazon.com/dp/B01KY78O8S, "CST Lighting Solar Ground Light 4-Pack, for Garden Landscape Lighting, Pathway, Stairway", Aug. 24, 2016.

https://www.amazon.com/Powered-Waterproof-Landscape-Lighting-Driveway/dp/B- 07125KXLW/ "NUMARDA 4Pcs 4 LED Solar Powered Ground Lights Outdoor lamp Waterproof LED Solar Path Lights Garden Landscape Spike Lighting for Yard Driveway Lawn Pathway—White", May 26, 2017.

https://www.amazon.com/Powered-Outdoor-Waterproof-Landscape-Lighting/dp/B07BQY5M5H/, "Hometom Solar Powered Ground Light Outdoor Lights Waterproof LED Solar Path Lights Garden Landscape Lighting—4 Pack", Jun. 8, 2017.

https://www.amazon.com/Powered-Alvivi-Outdoor-Waterproof-Driveway/dp/B073XLD3KN/, "Solar Powered Ground Light, Alvivi Outdoor Waterproof Garden Pathway Lights with 4 LEDs, Walkway Lights for Home, Yard, Driveway, Lawn, 4 Pack (White)", Jun. 24, 2017.

https://www.amazon.com/Wenjuan-Buried-Ground-Outdoor-Decking/dp/B077Z4QT5L/, "Wenjuan 8 LED Solar Power Buried Light Ground Lamp Outdoor Path Way Garden Decking", Dec. 5, 2017.

https://www.amazon.com/Underground-Rambling-Waterproof-Outdoor-Decking/dp/B078G56VLP/, "Solar Underground Light,Rambling 8LED Power Buried Light Under Ground Lamp Waterproof Outdoor Path Way Garden Decking Auto On Off Switch Cool White", Dec. 16, 2017.

https://www.amazon.com/ONEVER-Lighting-Waterproof-Driveway-Pathway/dp/B078- LVV7ZLT/, "8-LEDs Solar Power Ground Light, ONEVER Spike Lighting Built-in Light Sensor IPX4 Waterproof for Path Floor Yard Driveway Lawn Pathway (Pack of 4X)", Dec. 24, 2017.

* cited by examiner

SOLAR DISK LIGHT WITH SWIVEL MOUNT

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application is a continuation-in-part of U.S. patent application Ser. No. 29/662,559, filed Sep. 6, 2018, now pending, which is assigned to the assignee of this application and is incorporated by reference in its entirety for all purposes.

FIELD AND BACKGROUND OF THE INVENTION

The subject technology relates to small solar-powered lighting devices for portable or landscape use.

SUMMARY OF THE INVENTION

According to an aspect of the subject technology, a portable or landscape lighting fixture or luminaire consists of a self-contained light source, for example a disk light body, including one or more light-emitting diodes (LEDs), solar cells for collecting solar energy to power the LEDs, a rechargeable battery for storing energy collected by the solar cells, and driver circuitry to power the LEDs with the stored energy. The disk light body is mounted in a frame by means which permit the disk light to tilt or rotate within the frame, enabling the user to tilt or swivel the disk light to face in different directions. This permits the user to tilt or swivel the disk light to harvest solar energy and cast illumination in different directions while the frame remains in place.

For use as a landscape light, a mounting spike is attached to the frame, for affixing the lighting fixture to the ground. The mounting spike is preferably removable from the frame and consists of two interlocking blades. Each blade has integrally formed attachment arms for attaching the blade to the frame. The attachment arms are upswept, curved and shaped to create a clearance or gap between the spike and the ground on the one hand, and the disk light body on the other hand for sufficient clearance that the disk light may be tilted or swiveled within the frame, while the frame remains attached to the ground by means of the spike.

The various features of novelty which characterize the subject technology are pointed out with particularity in the claims annexed to and forming a part of this disclosure. For a better understanding of the subject technology, its operating advantages and specific objects attained by its uses, reference is made to the accompanying drawings and descriptive matter in which preferred embodiments of the subject technology are illustrated.

DETAILED DESCRIPTION OF THE INVENTION

Figure 1:
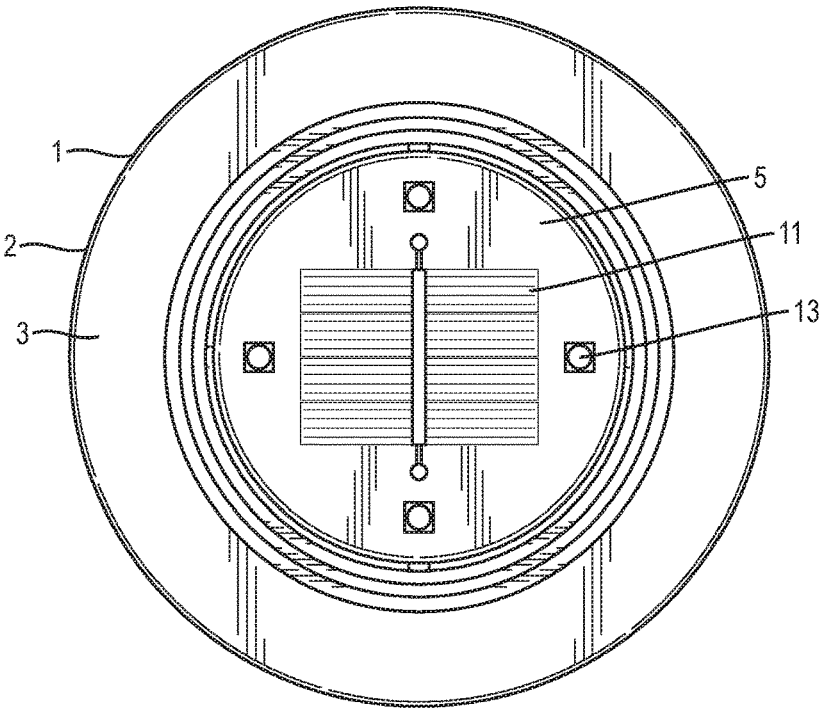
FIG. 1 is a view of the top of a disk light according to a non-limiting embodiment of the subject technology.

According to a non-limiting aspect of the subject technology, as shown in FIGS. 1-10 and 13-17, a disk light 1 comprises a disk body 5 pivotably mounted in a frame 2. Disk body 5 serves as a housing and carrier for solar cells 11 for harvesting solar energy and detecting ambient light; rechargeable battery 12 for storing the harvested solar energy; high-power COB or surface mount LEDs 13 (only one is numbered), powerable by battery 12 for emitting light; a two-position (ON/OFF) latching pushbutton switch 14 for enabling and disabling electrical power delivery to LEDs 14; and wiring and driver electronics (not numbered) for driving and controlling the solar cells 11, battery 12, and LEDs 13. Disk body 5 may have 4, 6, 8, or 12 LEDs. The switch, wiring and driver electronics are configured to deliver electrical power to the LEDs from the battery (thereby turning the LEDs on) when the switch is in the ON position and the solar cells are not detecting ambient light; and to cut off power to the LEDs (thereby turning the LEDs off) when the switch is in the OFF position or the solar cells are detecting ambient light. The solar cells 11, battery 12, LEDs 13, switch 14, and wiring and driver electronics are as known to those of skill in the art.

Figure 10:
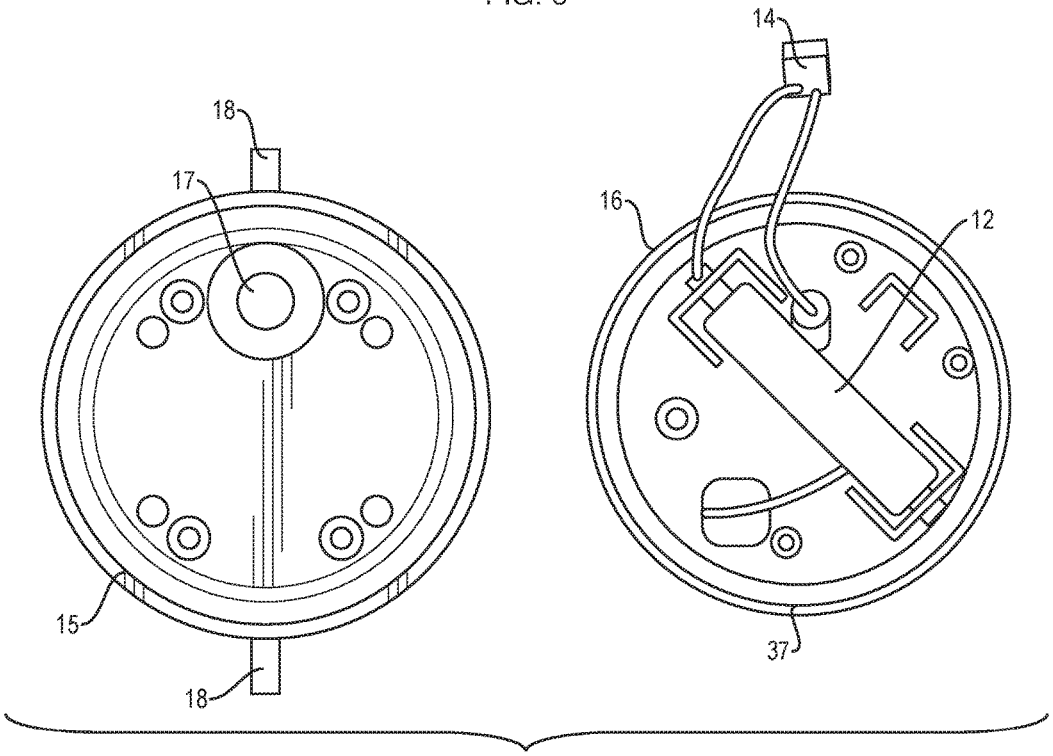
FIG. 10 is a top view of a disk body disassembly according to a non-limiting embodiment of the subject technology.

As best seen in FIG. 10, disk body 5 consists of lower shell 15 and upper shell 16, both made of metal or plastic which may be injection-molded. Lower shell 15 is attached to upper shell 16, for example, by screws, to form a disk-shaped housing. In a non-limiting embodiment, battery 12 and switch 14 are disposed on a lower surface of upper shell 16; solar cells 11, LEDs 13, and the driver electronics are disposed on an upper surface of upper shell 16 and are encapsulated with a transparent polymer layer. To enable use of switch 14, lower shell 15 carries a flexible boot 17 in a hole through lower shell 15 to cover switch 14. A polymer or elastomer O-ring seal 37 seals and weatherproofs any gap around the circumference when lower shell 15 is assembled to upper shell 16.

Disk body 5 has pegs 18 extending therefrom, for supporting disk body 5 tiltably and rotatably in frame 2. Pegs 18 are disposed to be co-linear to form a stable axis of rotation for disk body 5 in frame 2. Pegs 18 may be integrally formed with and extend from either lower shell 15 or upper shell 16. In the non-limiting embodiment of the Figures, pegs 18 are integrally formed with and extend from lower shell 15.

Figure 7:
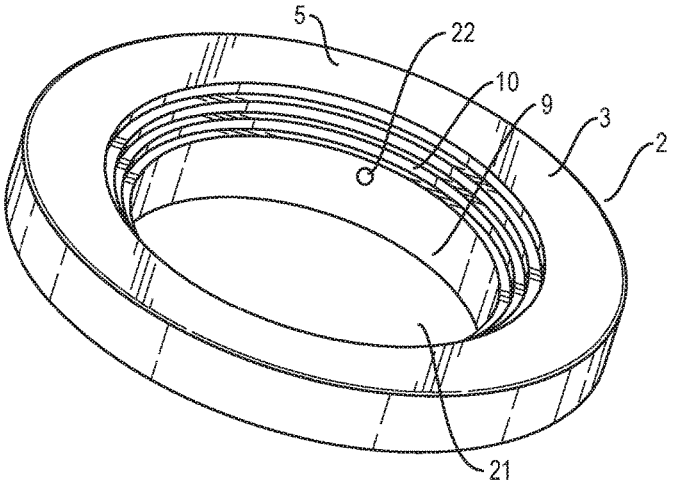
FIG. 7 is a high-angle view of the frame of a disk light according to a non-limiting embodiment of the subject technology.
Figure 8:
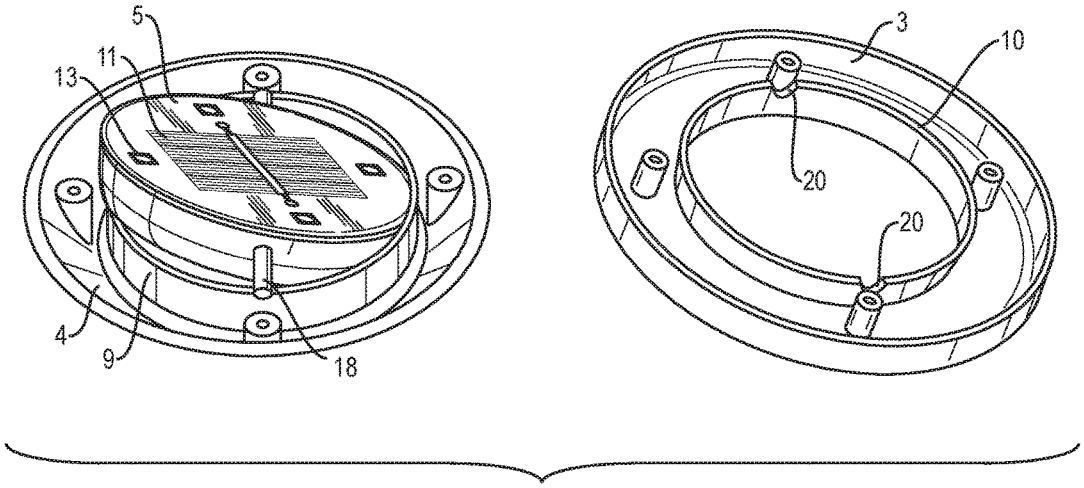
FIG. 8 is a high-angle view of a disk light with the frame disassembled according to a non-limiting embodiment of the subject technology.
Figure 9:
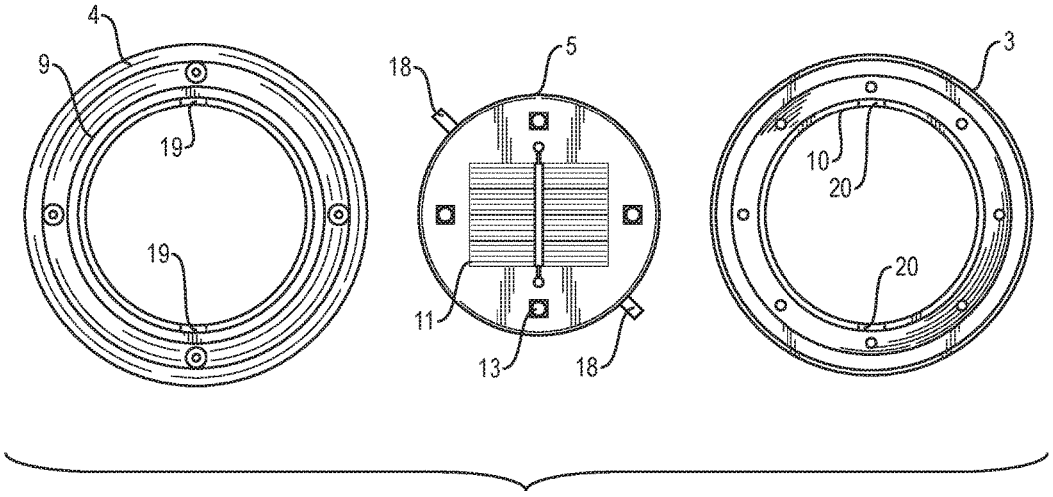
FIG. 9 is a high-angle view of a disk light with the frame disassembled according to a non-limiting embodiment of the subject technology.

As best seen in FIGS. 7, 8 and 9, frame 2 comprises frame top 3 and frame bottom 4 which is attached to frame top 3 by screws passing through holes in frame bottom 4 and affixed into holes in frame top 3. Frame 2 defines a circular opening 21 for receiving disk body 5. Frame bottom 4 comprises an inner rim 9. Likewise, frame top 5 comprises an inner rim 10. Inner rims 9, 10 each have, respectively, pairs of notches 19, 20. The notches are arranged co-linearly on the respective inner rims. Frame top 3 and frame bottom 4 are assembled to form frame 2 such that respective inner rims 9, 10 meet to form circular opening 21. Likewise, the pairs of the notches 19, 20 meet to form through-going holes 22 in frame 2 for receiving, holding and supporting pegs 18 of disk body 5, in a rotatable and tiltable configuration. Preferably, circular opening 21 is sized and shaped with respect to disk body 5 to allow for a clearance gap about the circumference of disk body 5, which permits disk body 5 to tilt and rotate about pegs 18. In a non-limiting embodiment, the clearance gap is sufficient to permit disk body 5 to perform complete rotations without colliding with or contacting frame 2.

Figure 2:
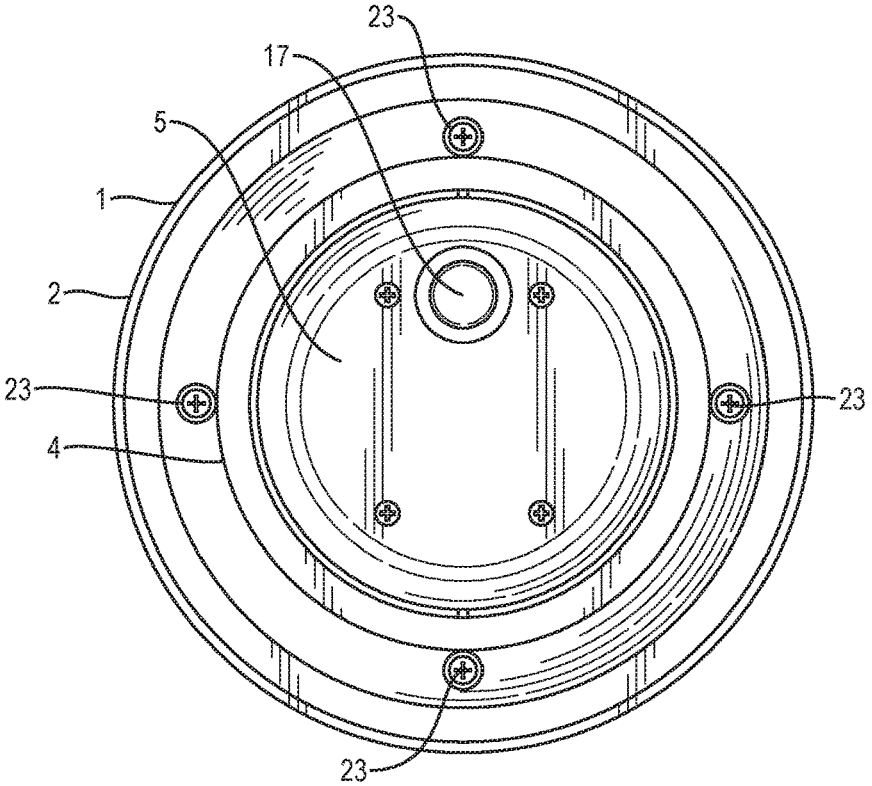
FIG. 2 is a view of the bottom of a disk light according to a non-limiting embodiment of the subject technology.
Figure 3:
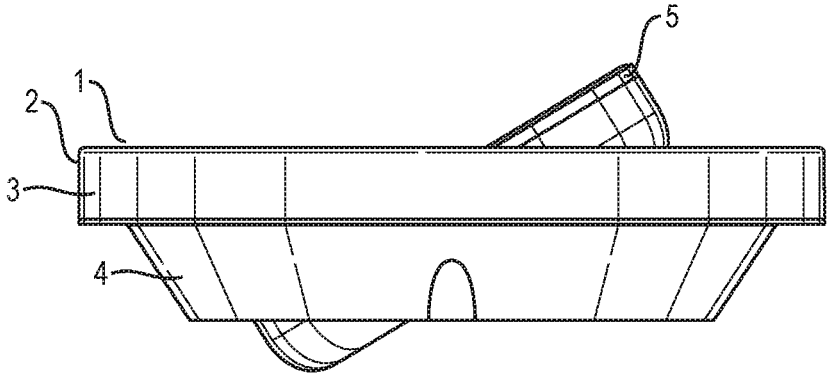
FIG. 3 is a view of the side of a disk light, with the disk body tilted with respect to the frame, according to a non-limiting embodiment of the subject technology.
Figure 4:
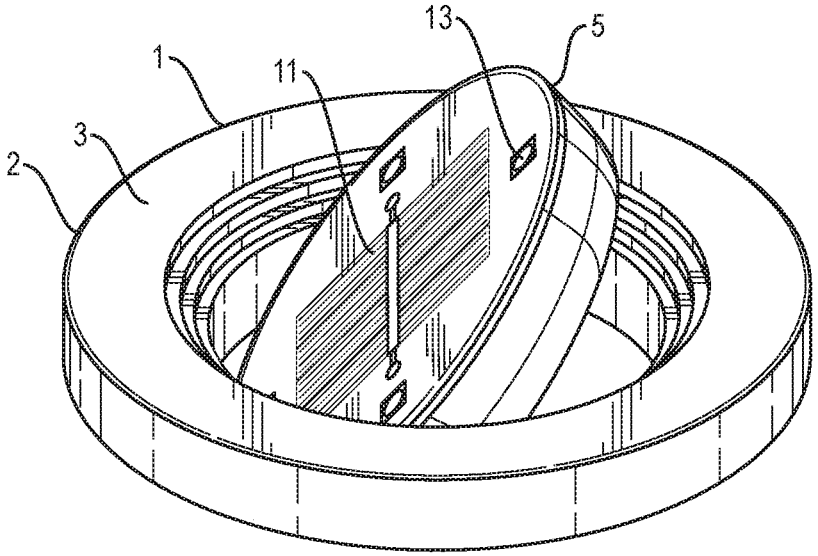
FIG. 4 is a high-angle view of the side of a disk light, with the disk body tilted with respect to the frame, according to a non-limiting embodiment of the subject technology.
Figure 5:
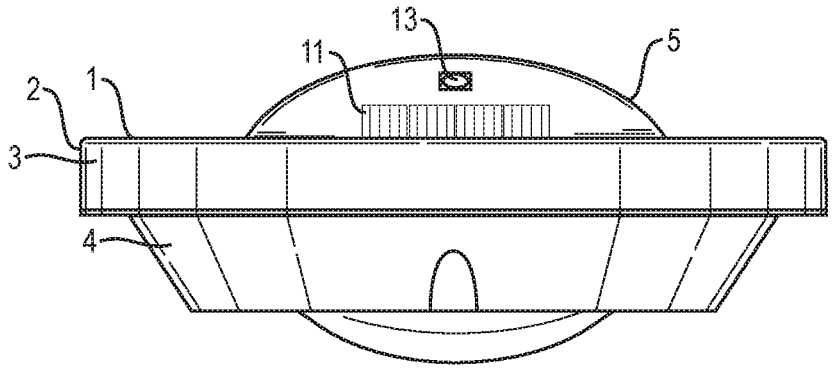
FIG. 5 is a view of the side of a disk light, with the disk body tilted with respect to the frame, according to a non-limiting embodiment of the subject technology.
Figure 6:
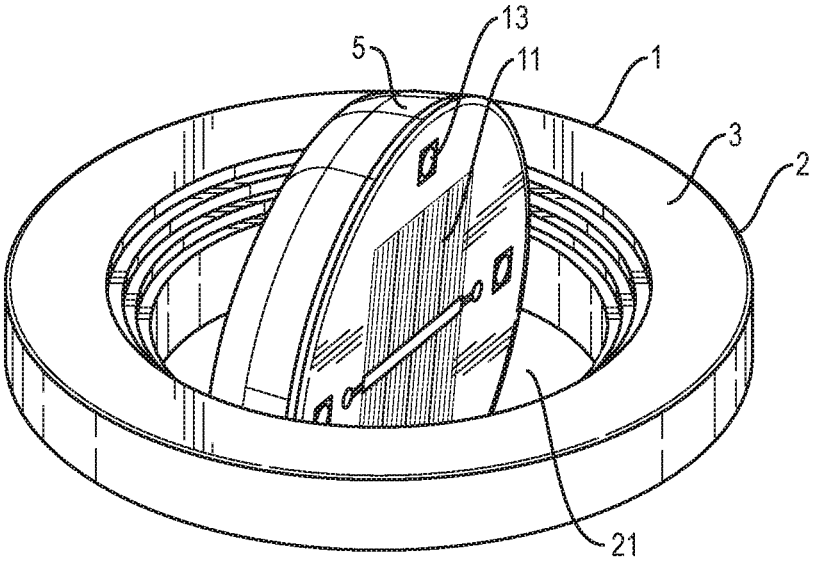
FIG. 6 is a high-angle view of the side of a disk light, with the disk body tilted with respect to the frame, according to a non-limiting embodiment of the subject technology.
Figure 11:
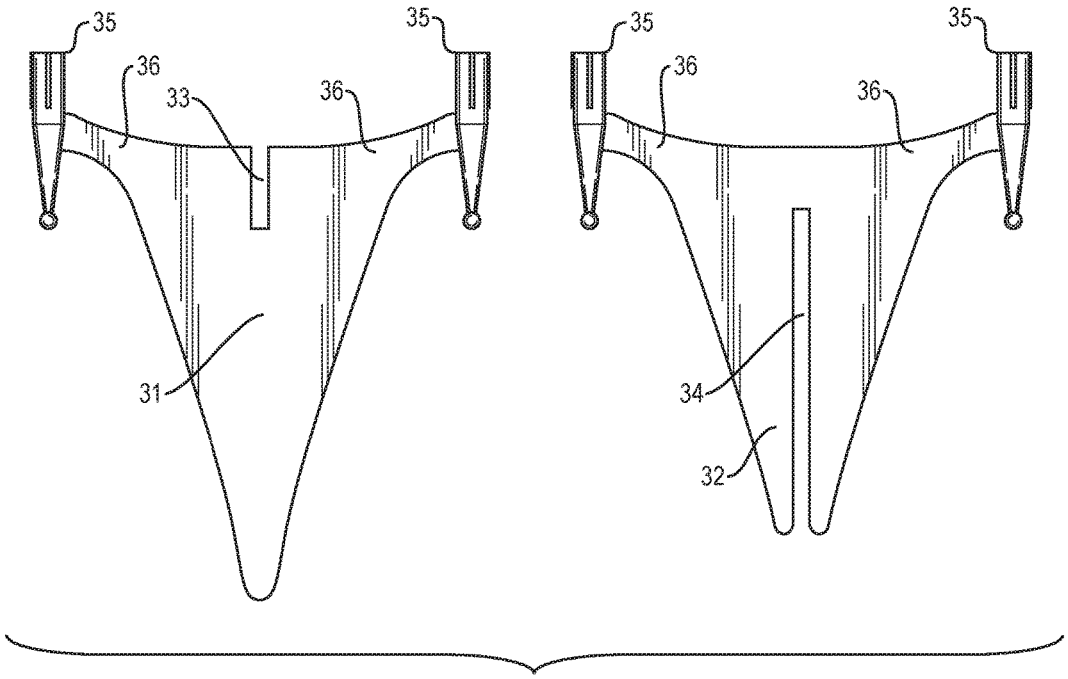
FIG. 11 is a view of the blade components of a landscape spike according to a non-limiting embodiment of the subject technology.
Figure 12:
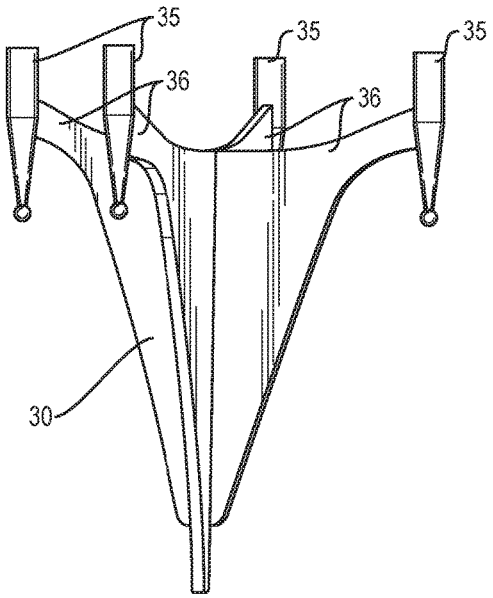
FIG. 12 is a view of a landscape spike according to a non-limiting embodiment of the subject technology.
Figure 13:
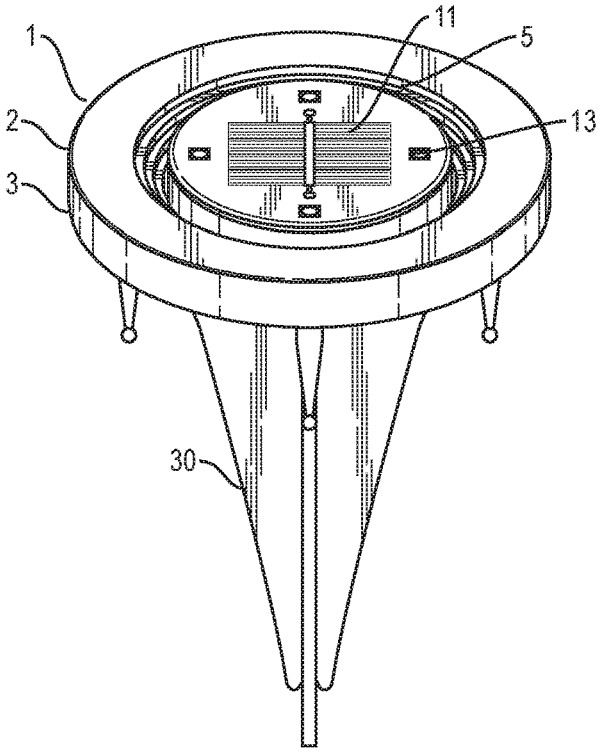
FIG. 13 is a high-angle view of a side view of a disk light with a landscape spike installed according to a non-limiting embodiment of the subject technology.
Figure 14:
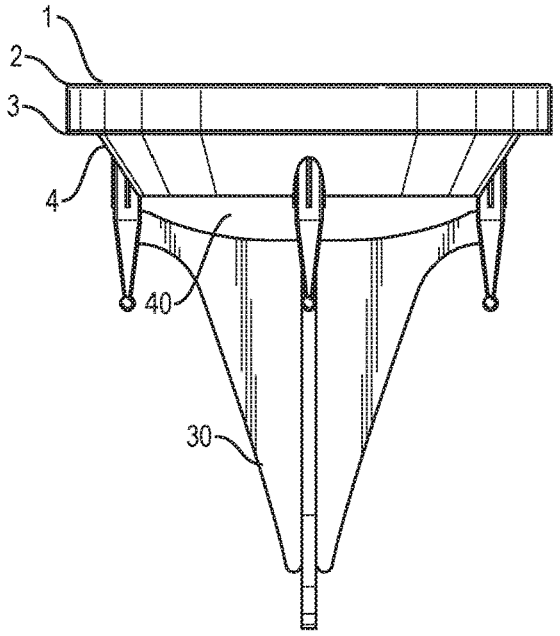
FIG. 14 is a view of a side view of a disk light with a landscape spike installed according to a non-limiting embodiment of the subject technology.
Figure 15:
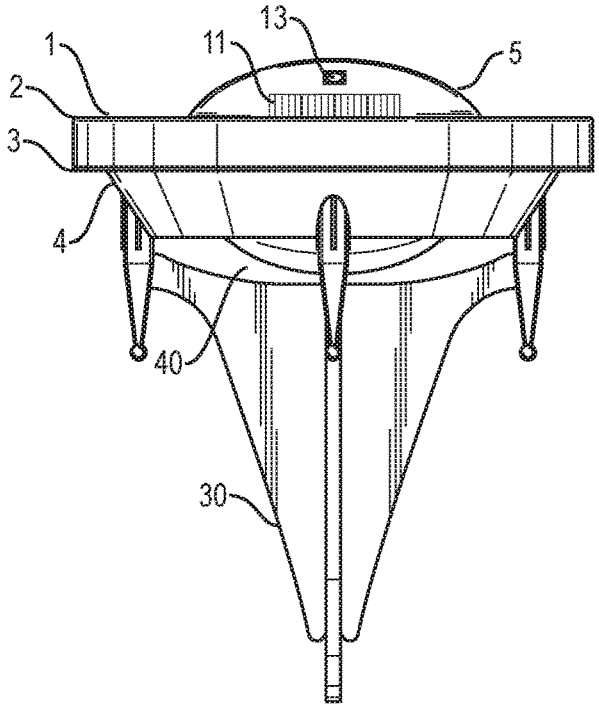
FIG. 15 is a view of a side view of a disk light with a landscape spike installed, with the disk body tilted with respect to the frame, according to a non-limiting embodiment of the subject technology.
Figure 16:
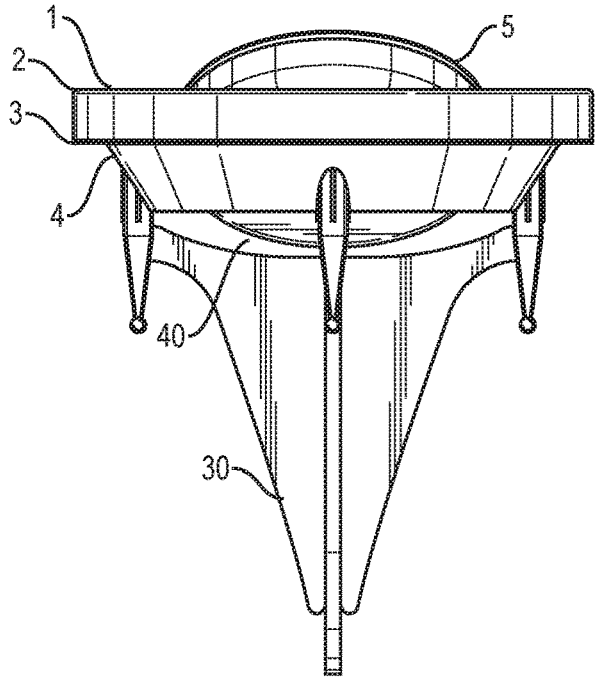
FIG. 16 is a view of a side view of a disk light with a landscape spike installed, with the disk body tilted with respect to the frame, according to a non-limiting embodiment of the subject technology.
Figure 17:
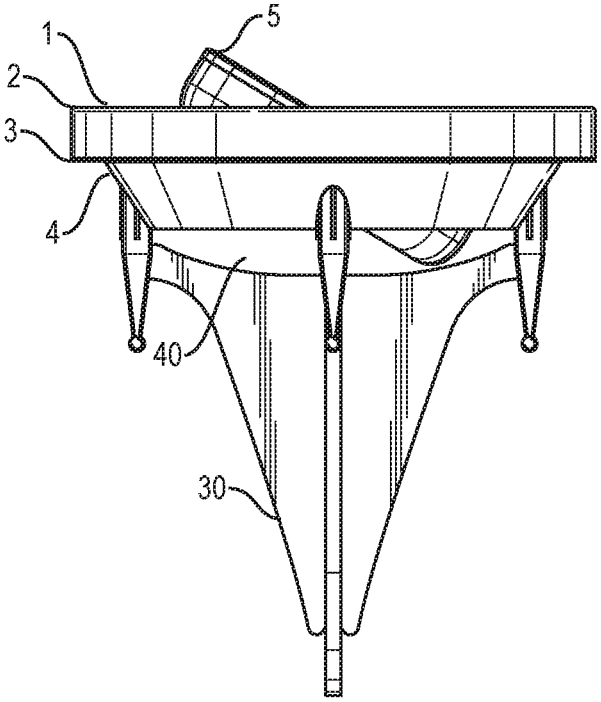
FIG. 17 is a view of a side view of a disk light with a landscape spike installed, with the disk body tilted with respect to the frame, according to a non-limiting embodiment of the subject technology.

As best seen in FIG. 2, frame 2 has recesses 23 in frame bottom 4 to permit removable attachment of a landscape spike to disk light 1. As best seen in FIGS. 11 and 12, in the non-limiting embodiment shown, landscape spike 30 is composed of long blade 31 and short blade 32, which are preferably made of metal or plastic. Blades 31, 32 have, respectively, slots 33, 34 for assembling and interlocking the blades together to form spike 30, as shown. Blades 31, 32 have integrally formed pegs 35 for insertion into recesses 23 to removably attach spike 30 to frame 2. Pegs 35 are integrally connected to blades 31, 32 by curved, upsweeping arms 36. Preferably, blades 31, 32 taper to a point on the end opposite the arms 36. Preferably, pegs 35 extend beyond arms 36 as shown, to provide additional points of contact with the ground when spike 30 is inserted into the ground.

As best seen in FIGS. 14-17, the curved and/or upsweeping shape of arms 36 opens up a clearance gap 40 between spike 30 and disk light 1, so that disk body 5 is given room to tilt within frame 2. According to a non-limiting embodiment, disk body 5 may be tilted up to 40 degrees from horizontal until it contacts an arm 36. In other non-limiting embodiments, disk body 5 may be tilted up to 10, 15, 20, 25, 30, 35, 40, 45, 50, 55, 60, 65, 70, 75, 80, or 85 degrees from horizontal (0 degrees relative to the frame) until it contacts an arm 36. In other non-limiting embodiments, disk body 5 may perform complete rotations without contacting an arm 36. The permitted degree of tilt will depend on the geometry of arms 36, frame 2 and disk body 5.

According to a non-limiting embodiment of the subject technology, a landscape light kit comprises disk light 1, long blade 31 and short blade 32. The end-user assembles blades 31, 32 to form spike 30, and assembles spike 30 to disk light 1, to form a finished tiltable landscape disk light assembly.

It should be understood that the ornamental appearance of the tiltable disk lights and components thereof as shown in the Figures are within the scope of the subject technology.

While specific embodiments of the invention have been shown and described in detail to illustrate the application of the principles of the invention, it will be understood that the invention may be embodied otherwise without departing from such principles. It will also be understood that the present invention includes any combination of the features and elements disclosed herein and any combination of equivalent features. The exemplary embodiments shown herein are presented for the purposes of illustration only and are not meant to limit the scope of the invention.

What is claimed is:

1. A tiltable solar [disk] light comprising:

a [disk] *light* body comprising a [disk-shaped] housing, the housing containing lighting components comprising solar cells for harvesting solar energy [and detecting ambient light]; a rechargeable battery for storing the harvested solar energy; LEDs for emitting light; a [latching pushbutton] switch having an ON position and an OFF position for enabling and disabling electrical power delivery to the LEDs from the battery; and wiring and driver electronics for operably connecting the solar cells, battery, switch, and LEDs and configured to deliver electrical power to the LEDs from the battery when the switch is in the ON position [and the solar cells are not detecting ambient light] and to cut off power to the LEDs when the switch is in the OFF position [or the solar cells are detecting ambient light];

the [disk] *light* body further comprising a pair of pegs extending from the housing, the pegs in a co-axial arrangement to form an axis of rotation for the [disk] *light* body;

a frame defining [a circular] *an* opening for receiving the [disk] *light* body, the frame having an inner circumference around the [circular] opening, and two holes in the inner circumference on opposite sides of the [circular] opening for receiving the pair of pegs and tiltably supporting the [disk] *light* body, the [circular] opening being sized and shaped to define a first clearance gap around the [disk] *light* body to permit the [disk] *light* body to tilt within the frame about the axis of rotation formed by the pegs*;*

*a landscape spike removably attached to the frame, the landscape spike configured for insertion into the ground, thereby affixing the tiltable solar light to the ground;*

*wherein the landscape spike is connected to the frame by curved arms configured to define a second clearance gap between the spike and the frame to permit the light body to tilt within the frame about the axis of rotation formed by the pegs.*

[2. The tiltable solar disk light of claim 1 further comprising a landscape spike removably attached to the frame, the landscape spike configured for insertion into the ground, thereby affixing the tiltable solar disk light to the ground.]

[3. The tiltable solar disk light of claim 2 wherein the landscape spike is connected to the frame by curved arms configured to define a second clearance gap between the spike and the frame to permit the disk body to tilt within the frame about the axis of rotation formed by the pegs.]

4. The tiltable solar [disk] light of claim [3] *1*wherein the [disk] *light* body may be tilted up to 35 degrees from horizontal relative to the frame until it contacts an arm.

5. The tiltable solar [disk] light of claim [3] *1*wherein the [disk] *light* body may be tilted up to 40 degrees from horizontal relative to the frame until it contacts an arm.

6. The tiltable solar [disk] light of claim [3] *1*wherein the [disk] *light* body may be tilted up to 45 degrees from horizontal relative to the frame until it contacts an arm.

7. The tiltable solar [disk] light of claim [3] *1*wherein the [disk] *light* body may be tilted up to 50 degrees from horizontal relative to the frame until it contacts an arm.

8. A kit for making a tiltable solar [disk] light assembly, the kit [consisting of a tiltable solar disk light according to claim 1, and] *comprising:*

(*a*) *a tiltable solar light comprising:*

*a light body comprising a housing, the housing containing lighting components comprising solar cells for harvesting solar energy; a rechargeable battery for storing the harvested solar energy; LEDs for emitting light; a switch having an ON position and an OFF position for enabling and disabling electrical power delivery to the LEDs from the battery; and wiring and driver electronics for operably connecting the solar cells, battery, switch, and LEDs and configured to deliver electrical power to the LEDs from the battery when the switch is in the ON position and to cut off power to the LEDs when the switch is in the OFF position;*

*the light body further comprising a pair of pegs extending from the housing, the pegs in a co-axial arrangement to form an axis of rotation for the light body;*

*a frame defining an opening for receiving the light body, the frame having an inner circumference around the opening, and two holes in the inner circumference on opposite sides of the opening for receiving the pair of pegs and tiltably supporting the light body, the opening being sized and shaped to define a first clearance gap around the light body to permit the light body to tilt within the frame about the axis of rotation formed by the pegs;*

*and*

(*b*) a pair of blades configured to be interlocked together to form a landscape spike which is configured to be removably attached to the frame and also configured for insertion into the ground, thereby affixing the tiltable solar [disk] light to the ground.

9. The kit for making a tiltable solar [disk] light assembly of claim 8 wherein the blades comprise curved arms for connecting the spike to the frame, the curved arms configured to define a second clearance gap between the spike and the frame to permit the [disk] *light* body to tilt within the frame about the axis of rotation formed by the pegs.

10. The kit for making a tiltable solar [disk] light assembly of claim 9 wherein the [disk] *light* body may be tilted up to 35 degrees from horizontal relative to the frame until it contacts an arm.

11. The kit for making a tiltable solar [disk] light assembly of claim 9 wherein the [disk] *light* body may be tilted up to 40 degrees from horizontal relative to the frame until it contacts an arm.

12. The kit for making a tiltable solar [disk] light assembly of claim 9 wherein the [disk] *light* body may be tilted up to 45 degrees from horizontal relative to the frame until it contacts an arm.

13. The kit for making a tiltable solar [disk] light assembly of claim 9 wherein the [disk] *light* body may be tilted up to 50 degrees from horizontal relative to the frame until it contacts an arm.

14. A tiltable solar [disk] light kit, the kit comprising:

a [disk] *light* body comprising a [disk-shaped] housing, the housing containing lighting components comprising solar cells for harvesting solar energy [and detecting ambient light]; a rechargeable battery for storing the harvested solar energy; LEDs for emitting light; a [latching pushbutton] switch having an ON position and an OFF position for enabling and disabling electrical power delivery to the LEDs from the battery; and wiring and driver electronics for operably connecting the solar cells, battery, switch, and LEDs and configured to deliver electrical power to the LEDs from the battery when the switch is in the ON position [and the solar cells are not detecting ambient light] and to cut off power to the LEDs when the switch is in the OFF position [or the solar cells are detecting ambient light];

the [disk] *light* body further comprising a pair of pegs extending from the housing, the pegs in a co-axial arrangement to form an axis of rotation for the [disk] *light* body;

a frame defining [a circular] *an* opening for receiving the [disk] *light* body, two holes being formed in relation to the [circular] opening for receiving the pair of pegs and tiltably supporting the [disk] *light* body, the [circular] opening being sized and shaped to define a first clearance gap around the [disk] *light* body to permit the [disk] *light* body to tilt within the frame about the axis of rotation formed by the pegs;

a pair of tapering blades having slots formed therein such that they can be interlocked together to form a landscape spike insertable into the ground, the blades also having integrally-formed arms, the landscape spike removably connectable to the frame by the arms;

the arms configured to define a second clearance gap when connected to the frame to permit the [disk] *light* body to tilt within the frame about the axis of rotation formed by the pegs until the [disk] *light* body contacts an arm at an angle of maximum tilt.

15. The tiltable solar [disk] light kit of claim 14 wherein the angle of maximum tilt is up to 40 degrees from horizontal relative to the frame.

16. The tiltable solar [disk] light kit of claim 14 wherein the angle of maximum tilt is up to 45 degrees from horizontal relative to the frame.

17. The tiltable solar [disk] light kit of claim 14 wherein the angle of maximum tilt is up to 50 degrees from horizontal relative to the frame.

*18. The tiltable solar light of claim 1 wherein the light body is disk-shaped.*

*19. The tiltable solar light of claim 1 wherein the opening is circular.*

*20. The tiltable solar light of claim 1 wherein the solar cells detect ambient light and the driver electronics are configured to deliver electrical power to the LEDs from the battery when the switch is in the ON position and the solar*

*cells are not detecting ambient light and to cut off power to the LEDs when the switch is in the OFF position or the solar cells are detecting ambient light.*

*21. The kit of claim 8 wherein the light body is disk-shaped.*

*22. The kit of claim 8 wherein the opening is circular.*

* * * * *